United States Patent Office 3,605,837
Patented Sept. 20, 1971

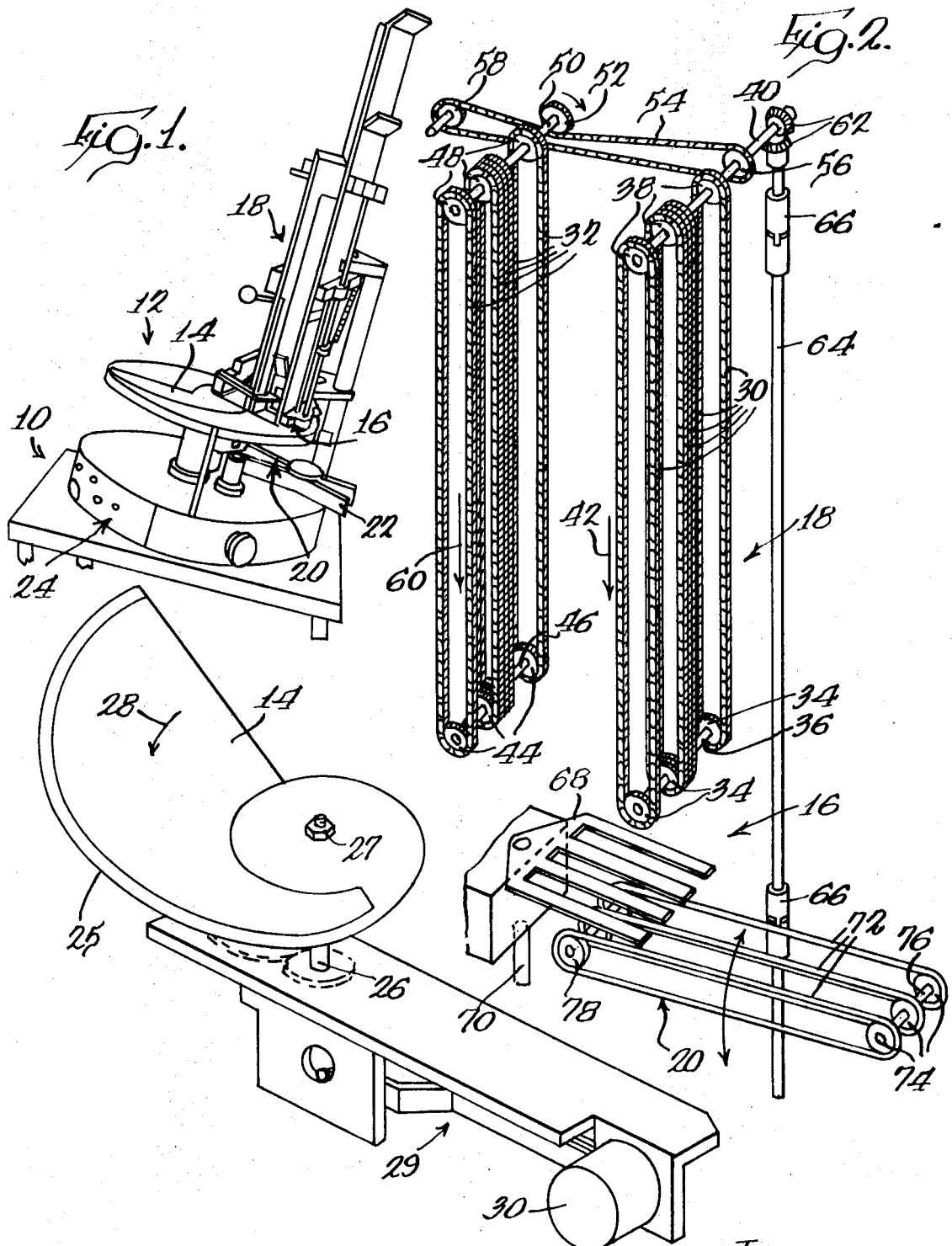

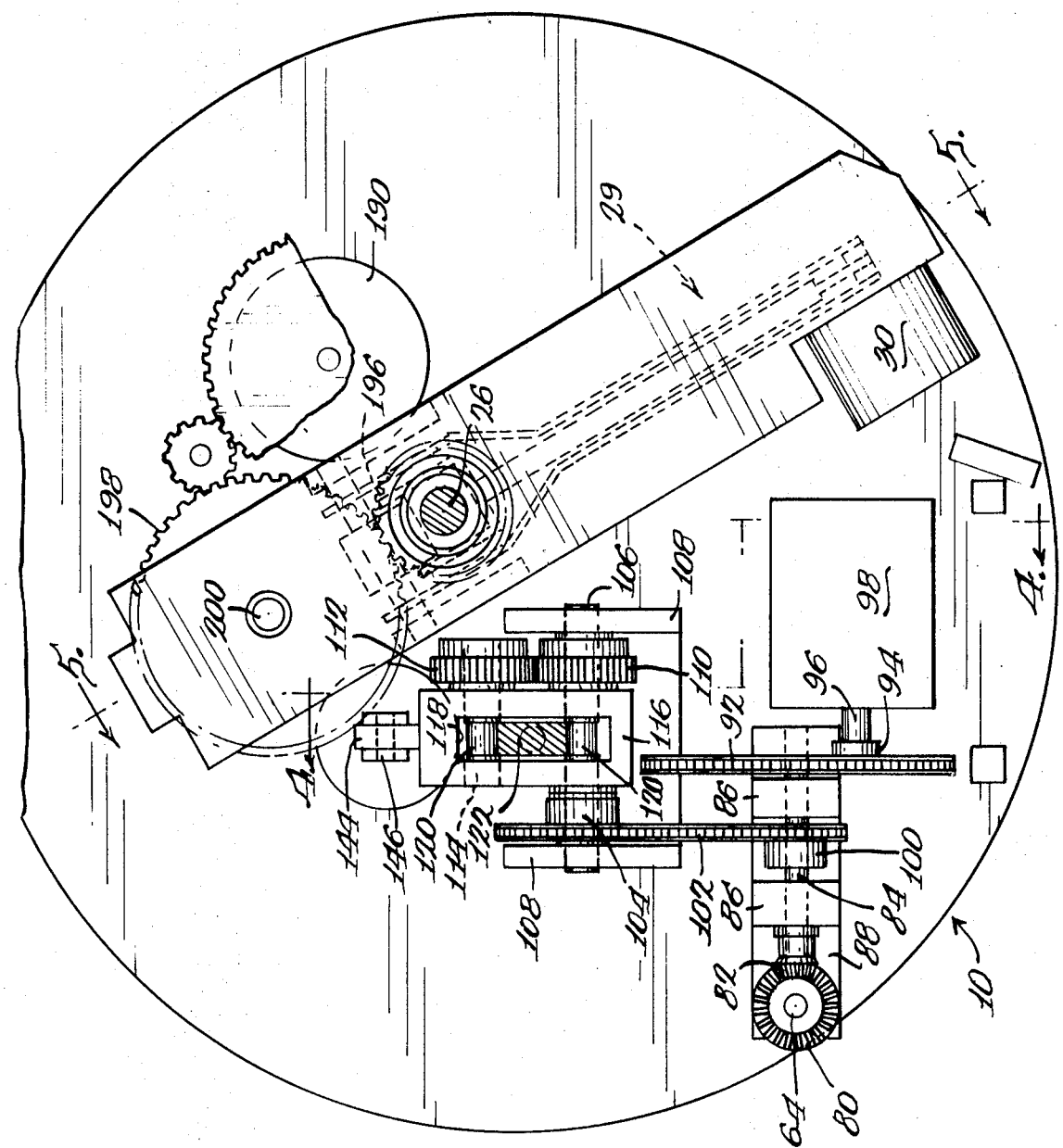

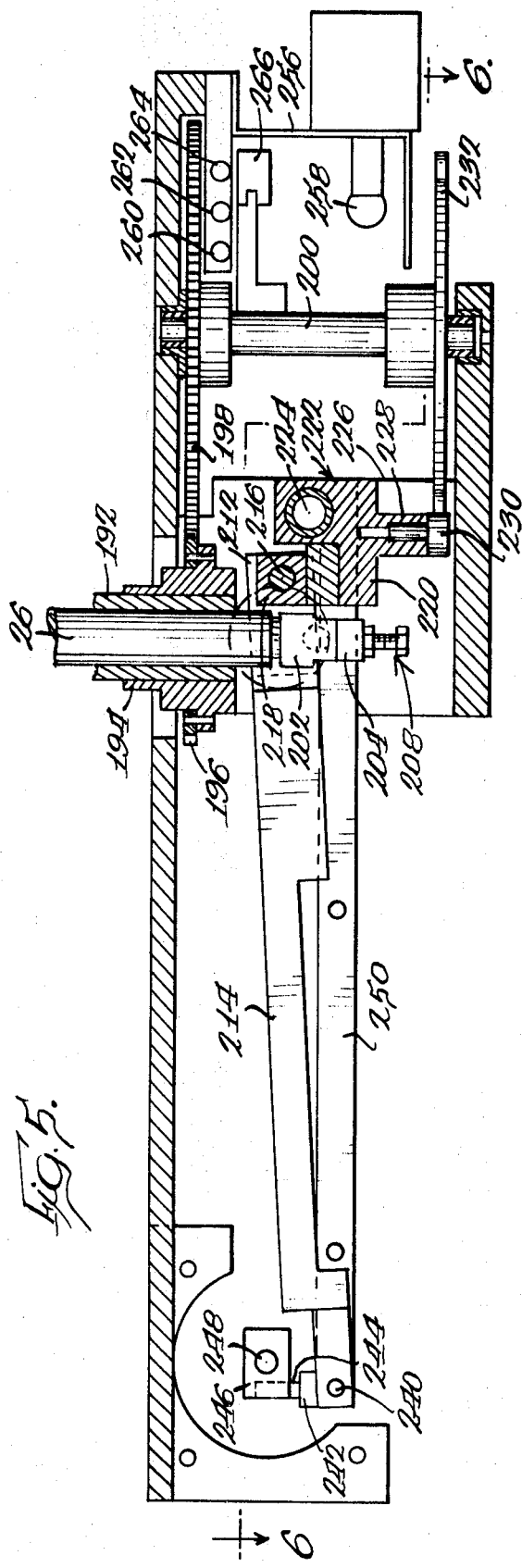
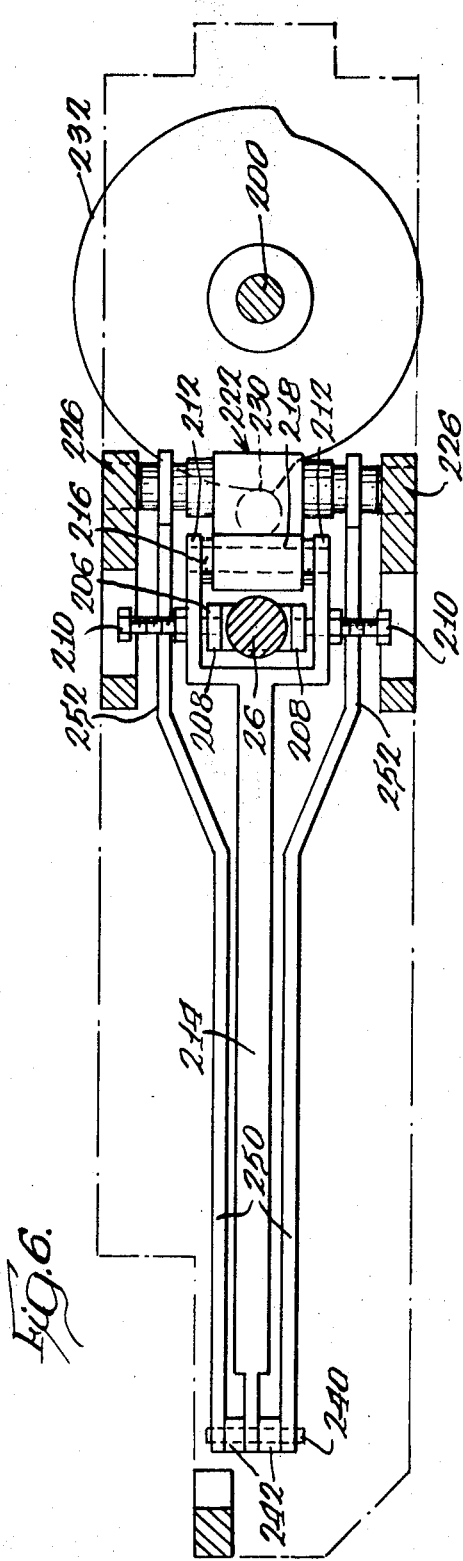
Fig. 5.
Fig. 6.

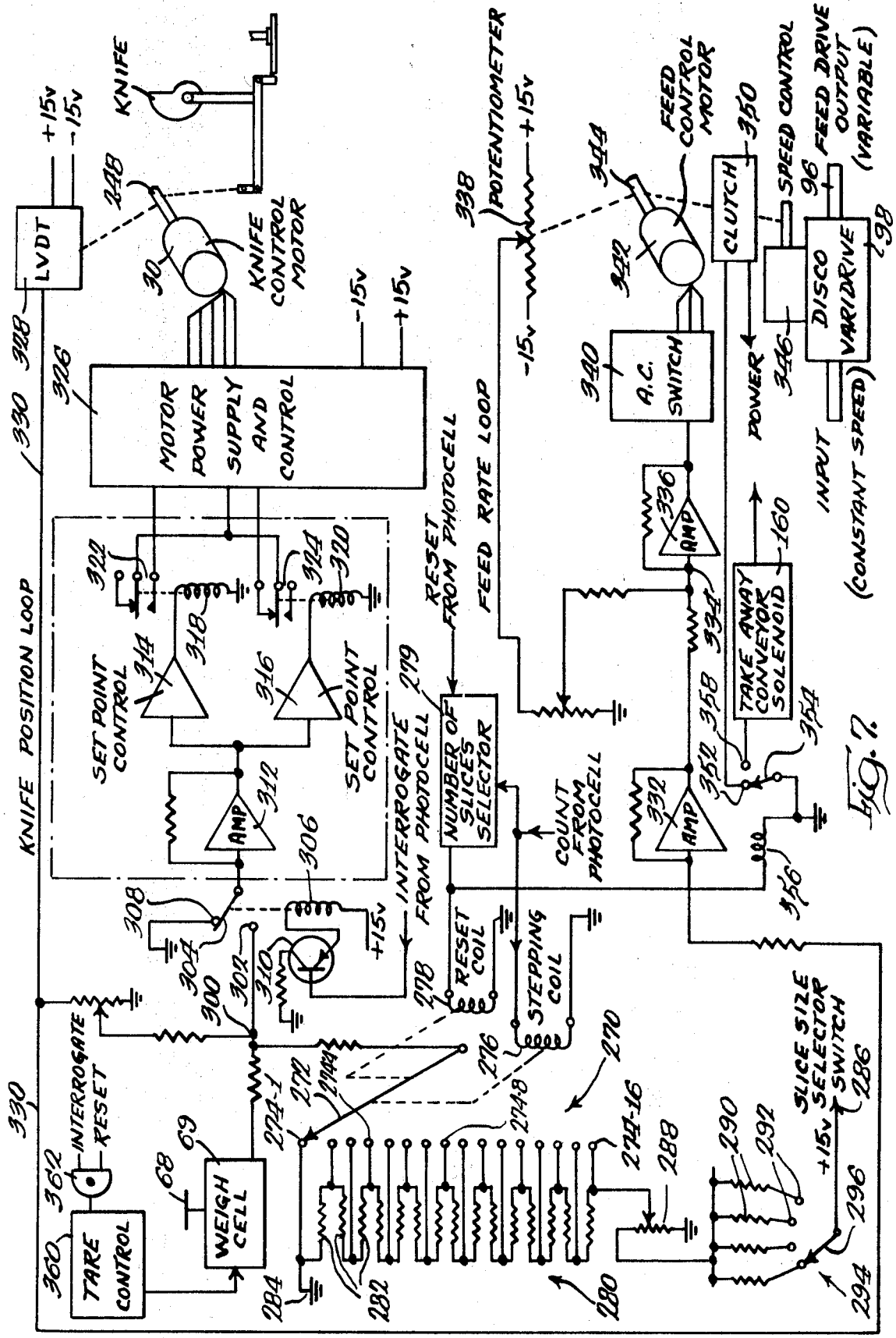

3,605,837
SLICER CONTROL SYSTEM
Robert D. Lambert, Fort Wayne, and Keith E. Flesch, Garrett, Ind., assignors to Peter Eckrich & Sons, Inc.
Filed Apr. 24, 1969, Ser. No. 819,017
Int. Cl. B26d 4/56
U.S. Cl. 146—94
16 Claims

ABSTRACT OF THE DISCLOSURE

A food slicing apparatus for use in the process of fabricating multiple slice food packages for closely controlling the weight of each package to thereby minimize so-called "give-away." The apparatus includes a cutting area in which a blade is operative together with feeding means for feeding a food product having a generally uniform cross section into the cutting area. After each slice to go into a package is cut, the weight of the slices cut to that point is judged against a predetermined standard and an adjustment in the feed rate and the position of the blade within the cutting area is made after each slice is cut as required to alter slice thickness and thus weight to achieve a standard package weight.

BACKGROUND OF THE INVENTION

Because of the relatively strict regulation of the food industry with respect to labelling practices, food producers have historically put more food in a container than stated on the label in order to insure that the great majority of containers will have at least the stated weight of food contained therein. The excess of food actually in the container over and above that stated to be contained within the container is termed "give-away," in view of the fact that the consumer pays for a package having the stated weight of food contained therein but in reality will normally receive somewhat more food.

While the amount of "give-away" in a typical food container is generally nominal in terms of a percentage of the stated weight, those skilled in the art are well aware of the fact that over a period of a year, the cost of such "give-away" to a given food producer will be substantial. Thus, every effort is made to minimize the amount of "give-away" and yet maintain a required percent of packages at a weight equal to or above the stated weight within the regulations of the appropriate governing body.

One area in which extensive effort has been expended to minimize "give-away" is in the marketing of multiple slice food packages containing such food stuffs as cheese and meat products such as sandwich meat. Typically, a rotating blade is used to slice cheese or meat in the form of a loaf and after a predetermined number of slices desired in a particular package is cut, the number of slices is weighed, the weight is compared against the pre-set standard, and an adjustment is made to the feed rate before the cutting of the slices to comprise the next package is initiated. Various proposals have been made whereby the foregoing method can be automated and through use of such devices, "give-away" has been cut to about 3 percent on the average.

The foregoing method and apparatus for practicing the same, while a significant improvement over those methods and apparatus used previously, totally fails to recognize one major variable and thus is not as effective as is desirable. Specifically, while the loaves being cut may be termed of generally uniform cross section, because of their nature, the cross section will vary somewhat along the length thereof due to knicks or the like. Similarly, oftentimes such loaves include entrained air with the result that there will be voids at various locations within the loaf resulting in a varying density.

The overall result is that while the weight of one package with respect to a standard may be some indication as to how the following package should be cut, as is done with prior art devices, such an indication is not totally reliable in view of the possibility that the next portion of the loaf to be cut may be of increased or decreased cross section and/or have a different density. In other words, if one package is perfectly on weight and all slices therein are cut to a thickness of "X" inches, the cutting of the slices for the next package to a thickness of "X" inches may not yield a package right on the predetermined weight in view of the variance in cross section of the loaf and the possibility that voids may or may not be present.

SUMMARY OF THE INVENTION

The invention provides a new and improved food slicing apparatus for use in fabricating multiple slice packages and which will hold "give-away" to a maximum of about one percent, about a seventy percent reduction in that heretofore obtainable in machines of this character.

This is accomplished by adjusting the cutting operation on a slice-by-slice basis as opposed to a package-by-package basis as is done in the prior art. Specifically, during the cutting of the slices to form a single package, the cumulative weight of the slices cut is judged, after each slice is cut, against a predetermined standard and appropriate corrections are made.

In the exemplary embodiment of the invention, there are provided means which define a cutting area and a rotary knife blade rotating at constant speed is located within the cutting area. Adjacent the cutting area and adapted to direct a food product to be cut into the cutting area is a continuously operable feeder means.

The knife is mounted for movement along its axis of rotation so that it may be located closer to or further away from the feeder means as desired. Similarly, means are provided to adjust the rate at which the feed means feed a loaf into the cutting area.

Such adjustments are correlated so that when a heavier slice is desired, the knife may be moved towards the feeder means and the rate of the feed of the feeder means is increased whereby a thicker slice is cut so that a heavier weight slice is obtained. Similarly, when a light weight slice is desired, the blade may be moved away from the feeder means and the rate of the latter retarded so that a thinner slice and thus a lighter weight slice is obtained.

As a result, when the partially sliced package weight is judged against the standard and found to be less than the standard, the cutting procedure may be altered to require a heavier slice. By the same token, when the partially sliced package is found to be of a greater weight than the predetermined standard, a light weight slice may be cut to bring the package weight in line with that desired.

In the exemplary embodiment, if a five percent correction need be made to bring the partially sliced package weight to the standard weight, both the knife position and the feed rate are adjusted by a five percent factor, or ten percent overall. However, substantially only the knife adjustment is effective as the next slice is cut and the principal effect of the feed rate adjustment is delayed until the second following slice is cut, at which time the initial knife position adjustment is no longer effective. In other words, the knife position adjustment provides an immediate but temporary correction while the feed rate adjustment provides a long term correction.

And because such changes are made on a slice-by-slice basis as opposed to a package-by-package basis, a variation of cross section or density from one slice to another may easily be corrected for in almost all instances during the cutting of the next slice to go into the package. Thus, much closer weight control can be maintained with a corresponding decrease in "give-away."

Other objects and advantages of the invention will become apparent from the following specification taken in conjunction with the accompanying drawings.

DESCRIPTION OF THE DRAWINGS

FIG. 1 is a perspective view of a slicing apparatus made according to the invention;

FIG. 2 is an enlarged, mechanical schematic illustrating the mechanical portion of the invention;

FIG. 3 is a generally horizontal section illustrating a portion of a knife location and feed rate adjusting mechanism;

FIG. 5 is an enlarged vertical section of a portion of the knife position adjusting mechanism taken approximately along the line 5—5 of FIG. 3;

FIG. 6 is an enlarged, generally horizontal section of the knife location adjusting mechanism taken approximately along the line 6—6 of FIG. 5; and FIG. 7 is an electrical schematic illustrating the control system for the slicing apparatus.

DESCRIPTION OF THE PREFERRED EMBODIMENT

Figure 4:
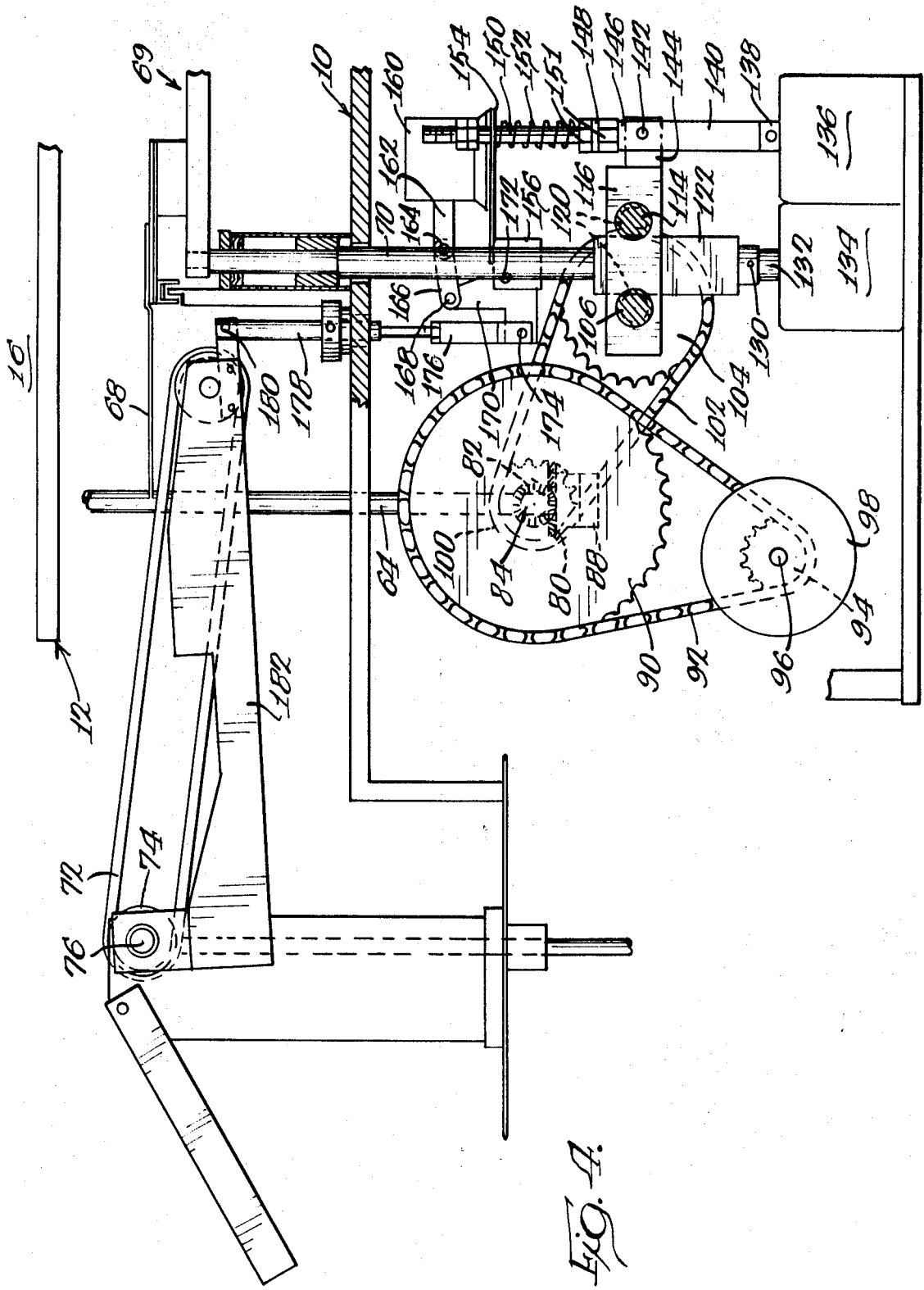
FIG. 4 is a generally vertical section taken approximately along the line 4—4 of FIG. 3.

An exemplary embodiment of a slicing apparatus embodying the invention is illustrated in FIG. 1 and is seen to include a base, generally designated 10, which may be slightly skewed to the horizontal. Supported for rotation above the base 10 is a flywheel-like disc, generally designated 12, which mounts a cutting blade 14 for movement through the cutting area, generally designated 16. Extending generally vertically upwardly from the base 10 and having its lower end disposed adjacent the cutting area 16 and above the blade 14 is a feeding means, generally designated 18, for feeding loaf-type food products having a generally uniform cross section such as cheese or meat loaves to be cut into slices for sandwich purposes.

Below the cutting area 16 and beneath the disc 12 is a slice receiving, weighing and conveying means, generally designated 20 and as seen in FIG. 1 the same includes a "take-away" conveyer 22. The slicing apparatus also includes various control switches, generally designated 24 and the like.

The structure described is basically a conventional slicing apparatus such as that manufactured by the Great Lakes Corporation of Chicago, Ill., and which is known in the art as a "Great Lakes Slicer." Inasmuch as many of the mechanical details of the basic slicer are well-known in the art, it is not believed necessary to further describe the basic machine to the extent that it remains unmodified for use in the instant invention. Rather, attention will be directed at the improvements provided therein according to this invention and reference will be made to the conventional mechanisms only to the extent necessary to facilitate an understanding of this invention.

Turning now to FIG. 2, the blade 14 is shaped as a spiral segment and includes a cutting edge 24. The blade is mounted on a shaft 26 and is secured thereto by means of a nut 27. By means not shown, but known in the art, the blade 14 is driven by the flywheel-like disc 12 (FIG. 1) in the direction of an arrow 28 to traverse the cutting area 16.

A blade positioning linkage, generally designated 29, is associated with the shaft 26 to raise and lower the same thereby raising and lowering the location of the blade 14 with respect to the feeding means 18 so that the position of the cutting edge 25 within the cutting area 16 may be varied. A motor 30 controls the linkage 29 in a manner that will be seen in greater detail hereinafter.

The cutting area 16 is defined by the lower end of the feeding means 18 and the lowermost position of the blade 14. More specifically, the upper extent of the cutting area 16 is defined by the lower ends of a plurality of generally vertically arranged, endless food gripping conveyers 30 and 32 and conventional heel plates not shown. The conveyers 30 are mounted on lower sprockets 34 secured to an idler shaft 36 and extend to sprockets 38 mounted on a driven shaft 40. The shaft 40 is driven in such a way that the leftmost runs of the conveyers 30 are driven downwardly in the direction indicated by an arrow 42 and will be engaged with a loaf-type food product so that the same will be driven downwardly toward the cutting area 16.

The conveyers 32 are mounted at their lower end by sprockets 44 mounted on an idler shaft 46 and have their upper ends trained about sprockets 48 mounted on a driven shaft 50. The shaft 50 includes a drive sprocket 52 in engagement with a chain 54 which is trained about a sprocket 56 on the shaft 40. Additionally, the chain 54 is trained about an idler sprocket 58 and is arranged so that its upper run will extend over the sprocket 56 on the shaft 40 and under the sprocket 52 on the shaft 50 whereby the shafts 40 and 50 will rotate in opposite directions so that the rightmost runs of the conveyers 32 will be moved downwardly in the direction of an arrow 60. Again, the rightmost runs of the conveyers 32 are the loaf engaging surfaces and as a result, when a loaf is located between the conveyers 30 and 32, the same will be driven downwardly into the cutting area 16.

The shaft 40 is driven by a variable speed transmission unit (not shown in FIG. 2) by means of a connection thereto through a pair of bevel gears 62 and a shaft 64. The shaft 64 is generally vertically arranged and includes a pair of universal couplings 66.

As mentioned previously, below the cutting area there is located the slice receiving, weighing and conveying means 20 and as seen in FIG. 2, the same includes a fork-like platform 68 which is mounted on a conventional weigh cell 69 such as that obtainable from Automatic Timing and Controls of King of Prussia, Pennsylvania, which in turn is mounted on a generally vertical reciprocating shaft 70.

As will be described in greater detail hereinafter, the shaft 70 is driven downwardly at a uniform rate during the slicing operation from an initial, high position to a final, low position with the arrangement being such that the distance between the two positions is substantially equal to the height of a stack of slices to form a package received on the platform 68. The purpose of such movement is to maintain a slice receiving surface in a predetermined relationship with respect to the cutting area, whether the slice receiving surface be the upper surface of the platform 68 or the upper surface of a slice on a stack of slices resting on the platform 68. Slices cut by the edge 25 within the cutting area 16 fall downwardly onto the platform 68 which receives the same and by means of the weigh cell 69, the cumulative weight of the slices on the platform 68 is measured and a signal indicative of said weight is provided.

The slice receiving, weighing and conveying means further includes a movable endless conveyer comprised of a plurality of belts 72 which normally have their upper runs below the upper surface of the platform 68. The belts 72 are trained about sheaves 74 on a drive shaft 76 which also serves as a pivot axis for the belts and idler sheaves 78 mounted on a shaft (not shown). As will be seen, periodically the belts 72 are pivoted about the pivot axis provided by shaft 76 in a clockwise direction so that the upper runs are elevated through and between the tines in the platform 68 to thereby engage slices thereon and convey the same away for packaging or the like. Additionally, if desired, hold down means (not shown) may be provided to move downwardly against the upper side of the top slice in the package to keep the package of slices from bouncing when the belts 72 rise.

Turning now to FIGS. 3 and 4, certain of the mechanical specifics of the slicing apparatus may be seen with greater particularity. For example, the shaft 64 which causes operation of the feeding mechanism 18 is seen to include, at its lower end, a bevel gear 80 which is engaged with a bevel gear 82 affixed to a shaft 84. A pair of bearings 86 mounted on a bracket 88 and secured to the base 10 by any suitable means mount the shaft 80 for rotation.

As best seen in FIG. 4, the shaft 84 at one end thereof, mounts an enlarged sprocket 90 having a chain 92 trained thereabout. The chain 92 is additionally trained about a drive sprocket 94 mounted on the output shaft 96 of a conventional variable speed transmission unit 98. As will be pointed out hereinafter, the variable drive unit 98 is provided with a constant speed rotary input by means not shown and there is additionally associated therewith, a control motor which controls the output speed of the shaft 96 and thus ultimately the rate of travel of the conveyers 30 and 32.

The shaft 84 mounts a second sprocket 100 having a chain 102 trained thereabout, which chain is also trained about a driven sprocket 104. The sprocket 104 is mounted on a rotary shaft supported in bearings 108 and which additionally mounts a gear 110 which is engaged with a second gear 112. The gear 112 is mounted for rotation with a shaft 114 mounted in a yoke 116.

The shafts 106 and 114, intermediate their ends, and within an opening 118 in the yoke 116 include hardened roller surfaces 120 which may engage the side surfaces of a hardened, elongated bar 122 of generally rectangular cross section. Secured to the upper end of the bar 122 is the shaft 70 which, it will be recalled, mounts at its upper end, the weigh cell 69 which, in turn, mounts the fork-shaped platform 68. As seen in FIG. 4, the weigh cell 69 is at its lower extent of movement and in virtual abutment with the base 10.

At the lower end of the bar 122 there is a pivotal connection 130 to the armature 132 of a solenoid 134. The purpose of the solenoid 134 will be pointed out hereinafter.

Adjacent the solenoid 134 is a solenoid 136 which has its armature 138 pivotally connected to a link 140 which, in turn, is pivotally connected as at 142 to an ear 144 connected to the yoke 116.

A bifurcated yoke 146 extends upwardly from the ear 144, is pivotally connected thereto by the pivot 142 and includes a horizontal tab 148 apertured to receive a rod 150. By suitable means as nuts 151, the rod 150 is held within the aperture of the tab 148 in substantially the attitude shown in FIG. 4.

A spring 152 is wound about the rod 150 above the tab 148 and engages the underside of a generally horizontal plate 154 through which the rod 159 extends. A bracket 156 mounts the plate 154 at the attitude illustrated and the result is that the spring 152 will tend to urge the link 140 and the armature 138 of the solenoid 136 downwardly. Similarly, the yoke 116 will be urged towards a horizontal position.

The arrangement of the roller surfaces 120 on the shafts 106 and 114 within the opening 118 of the yoke 116 is such that when the yoke 116 is in a substantially horizontal position, the elongated bar 122 may be easily moved upwardly therebetween when the solenoid 134 is energized to extend its armature 132. Such will result in upward movement of the shaft 70 and thus, the weigh cell 69 as well as a fork-shaped platform 68 until the same is located immediately below the cutting area 16. On the other hand, when the solenoid 136 is energized to extend its armature 138, the link 140 will move upwardly against the influence of the spring 152 to thereby cock the yoke 116 so that the latter will be urged from a strictly horizontal position to cause the surfaces 120 to engage the sides of the bar 122.

Through the driving connection to the sprocket 104 mentioned previously, the roller surfaces 120 are made to rotate in opposite directions and in a direction which will tend to drive the bar 122, and thus the shaft 70, the weigh cell 69 and the platform 68 downwardly at a rate synchronized with the rate of feed. The arrangement is such that when the first slice of a package is to be cut, the platform 68 will be in its uppermost position to receive such a slice as it is cut from the loaf by the blade 14. With each cutting cycle, the platform 68 will be moved downwardly at a rate sufficient to allow the next subsequent slice to come to rest on top of the slices already resting thereon until such time as the programmed number of slices have been cut and the same are removed therefrom.

To this end, FIG. 4 also illustrates suitable means whereby slices accumulating on the fork-shaped platform 68 may be removed by means of the conveyer belts 72. The plate 154 mounts a solenoid 160 which has its armature 162 pivotally connected as at 164 to a link 166. The link 166 is pivotally connected at 168 to a bell crank 170 pivotally mounted at 172 to the bracket 156. The bell crank 170 is also pivotally connected at 174 to a link 176 which, in turn, connects to a rod 178 located above the base 10. The rod 178 is pivotally connected at 180 to a frame 182 which is pivotally mounted for rotation about the axis of rotation of the shaft 76 which, it will be recalled, mounts sheaves 74 about which the belts 72 are trained.

When the solenoid 160 is energized to pull in its armature 162, the bell crank 170 is pivoted about pivot point 172 in a clockwise direction thereby causing shaft 178 to rise and cause frame 182 to pivot in a counterclockwise direction about shaft 76. As a result, the upper runs of the belts 72 are thrust upwardly between the tines of the fork-shaped platform 68 to engage slices deposited thereon during the cutting process. As is well-known in the art, the belts 72 may be continually driven and as a result, upon engagement of the belt 72 with the slices, the same may be conveyed away for further processing in any suitable manner.

Returning to FIG. 3, suitably mounted within the base 10 is a drive motor 190 which is linked to drive the disc 12 by suitable gearing not shown herein in detail. Additionally, the drive motor 190 preferably provides a constant speed rotary input to the variable speed transmission unit 98 as mentioned previously.

Turning now to FIGS. 5 and 6, a means for adjusting the position of the knife 14 within the cutting area 16 may be seen in detail. The shaft 26 is mounted for reciprocating movement in a sleeve-like bearing 192 which, by means not shown, is secured to the disc 12 in driving relation therewith. As a result, the shaft 26 can move vertically within the sleeve 192. A second sleeve 194 is drivingly connected to the sleeve 192 and, in turn, mounts a gear 196 which is in engagement with another gear 198 affixed to a shaft 200. Ultimately, one of the gears 196 or 198 is driven by the motor 190 either directly or by means of suitable gearing so that the sleeve 192 will be driven to drive the disc 12 and, in turn, the knife 14. The particular mechanical arrangement is not of great moment with the exception that, in the exemplary embodiment, the ratio between the gears 196 and 198 must be such that sleeve 192 will rotate through two revolutions for every single revolution of the shaft 200.

The lower end of the shaft 26 is received within a bearing cup 202 which is mounted on the bight 204 of a U-shaped bracket 206. The bight 204 additionally includes a conventional adjustment screw arrangement, generally designated 208 so that the height of the cup 202, and thus the location of the shaft 26, with respect to the bight 204, may be adjusted.

The U-shaped bracket 206 includes upwardly extending legs 208 which are pivotally mounted by conventional adjustment bolts 210 to the arms 212 of a Y-shaped member 214. The arrangement is such that position of the U-shaped bracket 206 between the arms 212 of the Y-shaped member 214 may be adjusted by advancing one bolt 210 while retracting the other, or vice versa.

At the extremity of the arms 212, there is located a pivot pin 216 which rotatably mounts a block 218. As best seen in FIG. 5, the lower surface of the block 218 rests on the upper surface of one arm 220 of a bell crank, generally designated 222. The bell crank 222 is mounted for rotation about an axis defined by a pivot pin 224 which extends between a pair of upstanding members 226 located to either side of the assembly as viewed in FIG. 6.

The bell crank 222 also includes a downwardly extending arm 228 which, at its lowermost extremity, rotatably mounts a cam follower 230 which is engaged with the cam surface of a rotatable cam 232 which is mounted for rotation with the shaft 200.

Adjacent the leftmost extremity of the Y-shaped arm 214, there is provided a pivot pin 240 to which the Y-shaped arm 214 is pivotally secured. A bifurcated member 242 extends upwardly from the pivot pin 240 and includes a link 244 which is pivotally connected to an eccentric arm 246 mounted on the output shaft 248 of the motor 30 (FIG. 2).

Outwardly of the bifurcated member 242 there are provided a pair of arms 250 which are pivotally connected to the pivot pin 240 and which each includes an offset portion 252 which extends to and is pivotally mounted on the shaft 224. As a result of the foregoing, it will be appreciated that when the shaft 200 is rotated by the motor 190, the action of the cam 232 on the cam follower 230 will cause the bell crank 222 to oscillate about the pivotal axis provided by the shaft 224. In view of the engagement of the bell crank arm 220 with extremities of the arms 212 of the Y-shaped member 214, it will be appreciated that the same will be caused to oscillate about the pivot point 240 thereby causing the shaft 26 to reciprocate in a vertical direction.

It will be recalled that the ratio between the gears 196 and 198 is such that the shaft 200 will rotate once for every two revolutions of the shaft 26. Thus, for one low on the cam 232, the shaft 26 will reciprocate but once during each two revolutions. As will be seen, during one revolution thereof, the blade 14 is located within the cutting area 16 so as to cut a loaf being fed downwardly by the feeding means 18 while on the second revolution of the shaft 26, the knife blade 14 is lowered to a point below the cutting area so that it will not engage the loaf. At this time, an adjustment in the feed rate and a programmed adjustment in knife height may be made for the next cutting cycle. Thus, each cutting cycle consists of two revolutions of the shaft 26 with the shaft 200 being basically a timing shaft.

In order to adjust the height of the knife within the cutting area for weight adjustment purposes, the motor 30 is brought into play and depending upon whether the blade should be moved upwardly or downwardly from the position in which it is operating at any given instant, the shaft 248 is turned thereby rotating the eccentric link 246 and raising or lowering the link 244 to raise or lower the pivot point 240. As a result, the Y-shaped member 214 as well as the arms 250 will be pivoted in a counter-clockwise or clockwise direction about the pivot point provided by the shaft 224 to lower or raise the shaft 226, respectively.

As mentioned previously, the shaft 200 is principally a timing shaft and to this end, a bracket 256 mounts a lightbulb 258. Mounted just below the gear 198 are three photocells, 260, 262 and 264 respectively. Interposed between the photocells 260–264 and the light source 258 is a timing disc 266 which is mounted for rotation with the shaft 200. The disc 266 may be provided with various apertures (not shown) so that at certain points during the rotation of the shaft 200, the position of which is indicative of a particular stage in each cutting cycle, one or more of the photocells 260–264 may be exposed to the light source 258 to provide suitable control signals.

In the exemplary embodiment, sequential "Count," "Reset" and "Interrogate" signals are provided. A control means utilizing the signals and for controlling the various instrumentalities for adjusting the feed rate and the position of the plate within a slicing area is illustrated in FIG. 7 and includes a counter in the form of a stepping switch, generally designated 270, having a wiper 272 which may be advanced, seriatim, to contacts 274. A conventional stepping coil 276 is provided and the same is arranged to be pulsed once for each slicing cycle. To this end, a "count" signal from one of the photocells 260–264, suitably amplified by means not shown, may be used to cause appropriate advancement of the wiper 272.

The stepping switch 270 additionally includes a reset coil 278 which, when pulsed, will cause the wiper 272 to be moved back to its home position as shown in FIG. 7. The coil 278 may receive a resetting pulse from a conventional "number of slices selector" 279 which, in turn, receives "count" and "reset" signals from the photocells. When a predetermined number of slices for a package as manually selected have been cut and when the "reset" signal is received, the coil 278 is pulsed.

As illustrated, the stepping switch 270 has sixteen contacts, designated 274–1 through 274–16 and the same provides the apparatus with the capability of accurately cutting up to sixteen slices for use in a single package. However, the principles of the invention are equally applicable to the slicing of greater or lesser number of slices and no limitation is intended.

There is also provided a resistive matrix, generally designated 280, comprised of a plurality of individual resistors 282 which are connected in series to ground at 284 and ultimately to a source of power at 286. The contacts 274–1 through 274–16 are connected into the matrix 280 between individual resistors 282 and as a result, the voltage at each of the contacts 274–1 through 274–16 will differ, the magnitude of the same increasing with the number of the contact.

Interposed in the resistor string and between the ground point 284 and the source of power 286, is a scaling potentiometer 288 which may be adjusted so as to provide a desired voltage drop from the contact 274–16 to the contact 274–1. The scaling potentiometer 288 is connected to the parallel combination of a plurality of resistors 290 each of which is connected to a respective contact 292 of a switch, generally designated 294, having a wiper 296 connected to the source of power at 286. The resistors 290 are varied in size and, so that the switch 294 serves as a slice size selector switch. For example, closing of the call for a nominal slice weight of one ounce while closing the same through another contact may call for a nominal slice weight of 0.8 ounce.

The wiper 272 of the stepping switch 270 is connected to a summing point 300 which is also connected to the output of the weigh cell 69. The summing point 300 serves as a comparing means and is connected to the normally open contact 302 of a relay switch 304 operated by a relay coil 306. The relay switch 304 includes a normally closed contact 308 which is connected to ground.

The relay coil 306 is connected in series with the emitter-collector circuit of a transistor 310, and the two are interposed between power and ground. The base of the transistor 310 is adapted to receive the "interrogate" signal taken from one of the photocells 260 with suitable amplification so as to cause operation of the control circuit at a particular time during the slicing cycle. When such an "interrogate" signal is received, the transistor 310 is turned on to thereby energize the coil 306 to move the relay switch 304 to the contact 302. As a result, the voltage at the summing point 300 will be fed as an input to a servo amplifier 312 which will provide an output that is fed as an input to two set point control amplifiers 314 and 316 which have their respective outputs connected through relay coils 318 and 320 to ground. When the output of the amplifier 312 is of one polarity, the relay coil 318 will be energized to cause normally open switch 322 to be closed. On the other hand, when the voltage output from the amplifier 312 is of the opposite polarity, relay coil 320 will be energized to cause normally open switch 324 to be closed.

Both of the switches 322 and 324 are connected as inputs to a power supply and control 326 for the motor 30. Depending upon which of the relays 318 and 320 is energized, the output shaft 248 of the motor 30 will be driven either clockwise or counterclockwise to cause the raising or the lowering of the knife 14 within the cutting area, respectively.

The output shaft 248 is also connected with a conventional linear voltage differential transducer (LVDT) 328 which acts as a feedback potentiometer for the knife position circuit. As indicated, positive and negative power are applied to the LVDT 328 and an output signal is pulled off of a line 330 extending therefrom and fed back to the summing point 300. The arrangement is such that whenever the "interrogate" signal is present to cause the switch 304 to be closed through contacts 302, and the voltage at the summing point 300 is not equal to zero, the motor 248 will be energized and the direction of energization thereof dependent upon the polarity of the voltage at the summing point 300.

The voltage at the contacts 274–1 through 274–16 by the wiper 272 of the stepping switch 270 is indicative of a standardized or desired weight for the total number of slices cut to that point and to form a single package. Similarly, the voltage output from the weigh cell 69 to the summing point 300 indicates the actual weight of the number of slices cut to date and is of the opposite polarity of the signal applied to the summing point 300 from the stepping switch 270. Thus, when actual weight as determined by the weigh well 69 is equal to the programmed weight, the two voltages will be equal and opposite and a zero volt condition will be present at the summing point 300, assuming of course that no voltage is applied from the LVDT 328.

On the other hand, when the actual weight deviates from the desired weight, in the exemplary embodiment illustrated, the voltage at the summing point 300 will swing either negative or positive depending upon whether the actual weight is in excess of that desired or less than that desired, respectively. In such a case, when the "interrogate" signal is received to energize the relay coil 306, the negative or positive voltage will be applied by the amplifier 312 to the set point control amplifiers 314 and 316 to thereby cause an associated one of the relays 318 or 320 to be energized and cause appropriate rotation of the motor 30 to adjust the knife appropriately. As the shaft 248 of the motor 30 turns, the output signal from the LVDT 328 will change and the same will be applied back along line 330 to the summing point 300. When the output voltage of the LVDT 328 has changed sufficiently so as to cause the voltage at summing point 300 to again reach zero, the motor 30 will then be deenergized and the knife will remain at the new position until a further adjustment is called for.

For purposes of controlling the rate of feed, the line 330 is also connected as an input to an isolation amplifier 332 which has its output connected to a second summing point 334. The summing point 334 is connected to the input of an amplifier 336 as well as to the wiper of a feedback potentiometer 338 connected across positive and negative power. The output of the amplifier 336 is connected to an electromagnetic differential relay 340 which, in turn, has its output connected to a control motor 342 for the variable speed drive 98. The control motor 342 includes an output shaft 344 which is connected to the speed control adjustment shaft 346 of the variable speed drive 98 and to the wiper of the potentiometer 338.

As seen in FIG. 7, and as mentioned previously but not shown, the variable speed drive includes an input shaft 348 which may be connected to any suitable constant speed motor but preferably to the drive motor 190.

When the output signal from the LVDT 328 is not equal to zero volts, and if the wiper of the potentiometer 338 is centered, either a positive or a negative voltage (as opposed to zero volts) condition will exist at the summing point 334 and the amplifier 336 will provide an output to the electromagnetic differential relay 340. Depending upon the polarity of the voltage at the summing point 334, the electromagnetic differential relay 340 will cause either clockwise or counter-clockwise rotation of the shaft 344 and the control motor 342 thereby causing movement of the wiper of the potentiometer 338 to provide a signal to the summing point 344. When the shaft 344 has rotated a sufficient amount to cause the wiper of the potentiometer 338 to apply a signal to the summing point 334 of equal magnitude and opposite polarity as that applied thereto ultimately from the LVDT 328 a no voltage condition will exist and the electromagnetic differential relay 340 will sense the same to deenergize the control motor 342. At this point, further adjustment of the variable drive will not occur. Depending upon direction of rotation of the output shaft 344 the control motor 342 during the energization of the latter, the rate of rotation of the output shaft 96 of the variable drive 98 will either be increased or decreased to accordingly alter the feed rate of the feeding means 18.

From the foregoing, it will be recognized that the control system consists essentially of two servo loops, one for knife position and one for feed rate. The knife position loop responds directly to an error signal which is generated when the actual weight of one or more slices on the platform 68 does not equal the desired weight of the corresponding number of slices. In contrast, the feed rate loop responds to the adjustment made by the knife position loop when an error such as that mentioned above exists. That is, when the knife position loop adjusts in response to an error signal, the feed rate loop will adjust in response to the adjustment of the knife position loop.

The knife has a "home" position which is determined by the position of the shaft 248 of the motor 30 when the output of the weight cell 69 is at zero volts and the wiper 272 of the stepping switch 270 is on the contact 274–1. In order to null the knife position loop under such conditions the LVDT 328 must have a zero volt output.

In view of the mode of operation of the feed rate loop as stated previously, if the feed rate loop were continually responsive to the output of the LVDT 328, it too would have a "home" feed rate. However, such is undesirable for the following reason.

Because of the density of various loaf type products which may be sliced by the apparatus varies over a substantial range, it will be appreciated that a product of a density of about one-half of that of another product would have to be fed at twice the rate as the denser product in order to achieve the same nominal slice weight. If the feed rate loop had a "home" feed rate to which the system was periodically returned, some difficulty could be experienced if the apparatus were calibrated for one product and another product having a different density was utilized.

As a result, means are provided for disabling the feed rate loop during the time when the knife is returned to its "home" position. As seen in FIG. 7, an electromagnetic clutch 350 is interposed between the output shaft 344 of the control motor 342 and the speed control adjustment shaft 346. The clutch 350 is normally engaged by connection to a source of power and to ground through the normally closed contacts 352 of a switch 354 operated by relay coil 356. The relay coil 356 will be energized whenever the predetermined number of slices have been cut and when the apparatus is reset, and to this end, the same is interconnected between ground and a source of power controlled by the number of slices selector 279.

The switch 354 may also engage a normally open contact 358 to connect the take-away conveyer solenoid 160 between ground and power thereby energizing the same.

As a result of the foregoing, when the predetermined number of slices has been cut and a reset signal is received from one of the photocells, the number of slices selector 279 will issue a reset signal to the coil 278 to cause the wiper 272 to come to rest on the contact 274–1 thereby connecting summing point 300 to ground at 284.

Simultaneously therewith, the energization of the coil 356 will break the circuit to the clutch 350 thereby causing the same to disengage the control motor 332 from the speed control adjustment 346 and energize the take-away conveyer solenoid 160 thereby causing the take-away conveyer to remove the accumulated stack of slices from the platform 68. Accordingly, the output of the weigh cell 69, with no slices on the platform 68, will swing to zero volts (a slight deviation may occur if crumbs or fat, etc., adhere to the platform but the weight of such material will be so minimal as to be insignificant so that the output of the weigh cell 69 will be nominally zero volts).

Therefore, with the possible exception of the feedback from the LVDT 328, zero volts will be applied to the summing point 300. If the LVDT 328 also applies a zero volt potential to the summing point 300, the knife position loop will be at null and the knife in its "home" position.

On the other hand, if the output of the LVDT is not zero volts, such an output will act as an error signal to ultimately cause the motor 30 to drive the knife to its "home" position.

The swinging of the potential on the line 330 to zero volts with the homing of the knife will be sensed at the summing point 334 and as a result, if the wiper of the potentiometer 338 is not centered, the voltage applied to the summing point 334 thereby will act as an error signal to cause control motor 342 to drive the wiper of the potentiometer 338 to the center point thereby driving the feed rate loop to null. However, such energization of the control motor 342 will not affect the feed rate inasmuch as disengagement of the clutch 350 at this time will preclude adjustment of the variable speed drive 98.

As mentioned previously, there is some possibility that accumulated material on the platform 68 may cause a slightly erroneous output which can be of some significance in continuous operation. It is, therefore, desirable to retare the weigh cell 69 after the slices for each package have been cut so that with no slices on the platform 68, the output from the weigh cell 69 will be at zero volts. Inasmuch as when the last slice in a package is cut, further adjustment of the system cannot possibly affect the weight of that package, such adjustment is foregone so that the time period following the cutting of the last slice of the package and preceding the first slice in a subsequent package is used to retare the weigh cell.

To accomplish the retaring, a conventional tare control 360 may be employed. By means of a conventional AND gate 362, the "interrogate" signal and the resetting signal, from the number of slices selector 279 may be utilized to cause retaring of the weight cell. The arrangement is such that retaring will occur only during the normal "interrogate" period following the cutting of the last slice in the package.

Exemplary timing of the apparatus considering an overall cutting cycle to consist of three hundred sixty units (during each cutting cycle, the shaft 200 will rotate 360°) is as follows:

| | |
|---|---|
| Slicing cycle | 0–360 |
| Knife in cutting position | 0–180 |
| Cutting time | 0–90 |
| Slice falls on platform | 0–160 |
| Weigh cell settles out | 160–197 |
| Weigh cell response time | 197–263 |
| "Interrogate" signal | 263–360 |
| Knife correction | 263–360 |
| Feed rate correction | 263–360 |

With respect to the calibration of the resistors 282, the same may be set to apply voltages proportional to the weights set forth hereafter. Of course, it is to be understood that the volts per pound or ounce will depend upon the scaling of the output of the weigh cell 69. Considering an eight ounce, eight slice package, the resistors associated with the contact 272–2 through 274–9 should be adjusted to provide weight factors as follows:

| Slices: | Ounces |
|---|---|
| 1 | 1.02 |
| 2 | 2.02 |
| 3 | 3.02 |
| 4 | 4.02 |
| 5 | 5.02 |
| 6 | 6.02 |
| 7 | 7.02 |
| 8 | 8.02 |

In the exemplary embodiments the knife control motor 30 and the feed control motor 32 are arranged with respect to the LVDT 328 and the potentiometer 338, respectively, as well as to the various respective mechanical instrumentalities involved so that when an error of a given percentage with respect to the desired weight of a particular slice is ascertained, both will make a correction of that same percentage. For example, if it is ascertained that the weight of a partially sliced package is less than the standard weight by five percent of the weight of a single slice, the knife position will be adjusted so that the next slice will be five percent thicker than the preceding slice. Simultaneously, the feed rate will be increased by five percent. In other words, a total increase of ten percent is made.

Contrary to what might be expected, such a ten percent increase does not result in the partially sliced package weight following the cutting of the next slice being overweight by five percent of the weight of one slice. This is due to the fact that, when timing similar or identical to the exemplary timing set forth above is utilized, the feed rate correction will be made just prior to the cutting of the next slice and therefore will be relatively ineffective with respect to that slice. However, inasmuch as the knife position adjustment is made at the same time it will be completed in time before the cutting of the next slice is initiated so the full five percent correction caused by knife position change will be effected with but a small portion, normally about twenty percent, of the feed rate correction being effected.

The arrangement is such that the change of position of the knife effects an immediate but temporary correction while the feed rate adjustment trails behind to make a long term correction.

The manner in which such occurs will become apparent from the following example. Considering an eight ounce, eight slice package, let us assume that after two slices have been cut, the cumulative weight is ascertained to be 2.07 ounces. If the resistors are calibrated as stated previously, a five percent correction will be commanded so that the position of the knife will be immediately changed to a location wherein, for a constant feed rate a slice five percent thinner than the second slice would result.

Simultaneously, the feed rate is retarded by five percent but inasmuch as this change is only twenty percent effective for the third slice, a total correction for the third slice would be about six percent.

If it be further assumed that the normally present variables of cross section and/or voids in the loaf being cut would result in a slice of the same thickness weighing approximately one percent more than the preceding slice, it would be appreciated that when the six percent correction was made against the slice, the third slice would weigh about 0.95 ounce. As a result, the sensed weight following the third slice would be 3.02 ounces, or exactly on standard.

Inasmuch as such a condition would result in zero volts being present at the summing point 300, the knife will then be returned to its home position which will then correspond to a no correction situation. However, eighty percent of the feed rate change will still be effective with the net result that the fourth slice, for the same situations assumed previously with respect to the normally present variables, would weigh about 0.98 ounce so that after the fourth slice, a lesser, two percent error of the opposite magnitude would be present.

Such cycling quickly dampens out so that very quickly the apparatus homes in on the optimum feed rate and adjusts rapidly to the normal variables present in such an operation.

From the foregoing, it will be appreciated that the knife position correction provides an immediate, temporary correction following the cutting of a slice which is effective on the immediately succeeding slice to thereby compensate for the leg in response of the feed rate adjustment which necessarily will be present in the system wherein the feeding means are continually operable. By the same token, the feed rate adjustment acts as a long term adjustment effective on the second succeeding slice after that when the adjustment is made and all slices cut thereafter.

While the foregoing description considers that when a given correction is required, both the knife position and the feed rate are adjusted by the full amount of the correction, such need not be the case. In this respect, the most important factor is that the knife location correction be in excess of fifty percent of the required correction, i.e. for a five percent error, the knife location must be changed by something in excess of 2.5%. For best results, the knife location adjustment should be at least 80–90% of the error.

Furthermore, when the resistors are calibrated according to the relation set forth above, give-away is minimized while underweight packages are avoided. As mentioned previously, slice weight because of cross section and density changes varies no more than about ±two percent from slice to slice. When the foregoing resistor calibration is used, for an eight slice, eight ounce package situation, if the package weight after the seventh slice was 7.07 ounces, a five percent correction would result so that the eighth slice would weight about 0.95 ounce ±two percent or in the range from about 0.93 to 0.97 ounce. As a result, the total eight slice package weight would be in the range from 8.00 ounces to 8.04 ounces thereby holding give-away to a maximum of one-half of one percent while avoiding any possibility of underweight.

We claim:

1. Food slicing apparatus for multiple slice food packages comprising:

means for feeding a food product having a generally uniform cross section into a cutting area;

blade means cyclically operable to traverse said cutting area to cut a slice from a food product therein;

means adjacent said cutting area for receiving the slices to form a package cut by said blade means and for providing a signal indicative of the actual weight of the then cut slices to form a package;

means for providing a standard weight signal indicative of the desired weight of the then cut slices to form a package;

means for comparing said actual weight and said standard weight signals after substantially each slice is received by said receiving means for determining any difference therebetween;

and means responsive to said comparing means for changing at least one of the location of said blade means within said cutting area and the speed of operation of said feeding means according to a difference between said actual weight and said standard weight signals whereby package weight is controlled on a slice by slice basis as the slices to form a package are being cut.

2. Food slicing apparatus according to claim 1 wherein said blade means comprises a curved blade and means mounting said blade for rotation about an axis generally parallel to the direction in which said feeding means feeds a food product toward said cutting area and means for rotating said blade through successive cutting cycles; and said changing means includes means for selectively reciprocating said blade along said axis.

3. Food slicing apparatus according to claim 1 wherein said feeding means comprises means for engaging a loaf-type food product and adapted to advance the same longitudinally toward said cutting area in a direction non-parallel to the direction of traverse of said cutting area by said blade means, and means for driving said engaging means; and said changing means includes means for selectively altering the rate of operation of said driving means.

4. A food slicing apparatus according to claim 1 further including means mounting said blade means for movement in a direction non-parallel to the direction in which the same traverses said cutting area; and wherein said feeding means comprises means for engaging a loaf-type food product and adapted to advance the same longitudinally toward said cutting area in said first mentioned direction, and means for driving said engaging means; said changing means comprising means for selectively moving said blade means in said first mentioned direction and means for selectively altering the rate of operation of said driving means.

5. Food slicing apparatus for multiple slice food packages comprising:

means for feeding a food product having a generally uniform cross section into a cutting area;

blade means within said cutting area and cyclically operable to traverse said cutting area to cut a slice from a food product therein;

means for receiving the slices to form a single package cut by said blade means and for providing a first signal indicative of the actual weight of the then cut slices to form a package;

means for providing a second signal indicative of the desired weight of the then cut slices to form a package;

means for comparing said first and second signals after substantially each slice is received by said receiving means for determining any difference therebetween;

means responsive to said comparing means for causing a change in the thickness of the next slice to be cut and to form according to any difference between said first and second signals, said second signal providing means comprising a resistive matrix, counter means, means for stepping said counter means for each slice cut, and means responsive to said counter means for connecting into said matrix to provide a signal having a magnitude proportional to the desired weight of the number of slices then cut to form a single package.

6. A food slicing apparatus for use in the process wherein a food product having a generally uniform cross section is sliced and a plurality of the slices are utilized forming a single package having a predetermined weight, said apparatus comprising: means defining a cutting area in which a food product may be sliced; means for receiving the slices cut from the food product within said cutting area, said receiving means providing a signal indicative of the weight of the slices received thereby; means operative to remove slices from said receiving means when the predetermined number of slices to comprise a package have been received thereby; means for providing a second signal indicative of the desired weight of the number of slices cut and received by said receiving means; means for feeding a food product into said cutting area; blade means for traversing said cutting area to slice a food product therein; and means operative before the next slice is cut and responsive to said first and second signals for simultaneously adjusting the feed rate of said feeding means and altering the location of the traversal of said cutting area by said blade means, both according to the difference between said first and second signals so that when said actual weight is less than said desired weight, a thicker, and thus heavier slice may be cut and when said desired weight is less than said actual weight, a thinner slice may be cut.

7. A food slicing apparatus according to claim 6 wherein said last named means comprises servo means including a blade position loop responsive to said first and second signals, and a feeding rate loop responsive to said blade loop.

8. A food slicing apparatus according to claim 7 further including means operative after a predetermined number of slices have been cut for "homing" said blade means to a predetermined position within said cutting area, and means operative during the "homing" of said blade means for disabling said feed rate loop.

9. A food slicing apparatus for multiple slice food packages comprising: means for continuously feeding a food product having a generally uniform cross section into a cutting area; blade means within said cutting area cyclically operable to traverse said cutting area to cut a slice from the food product being introduced therein by said feed means; means adjacent said cutting area for receiving the slices to form a package cut by said blade means and providing a first signal indicative of the actual weight of the then cut slices to form a package; means for providing a second signal indicative of the desired weight of the then cut slices to form a package; means operative after the cutting of a slice and before the cutting of the next slice for comparing said first and second signals after substantially each slice is received by said receiving means for determining any differences therebetween; and means responsive to said comparing means for immediately changing the location of said blade means within said cutting area prior to initiation of the cutting of said next slice, and for, just prior to the cutting of said next slice, changing the feed rate of said feeding means, both according to any difference between said first and second signals whereby the change of location of said blade means provides an immediate, temporary correction and the changing of the speed of operation said feeding means provides along run correction to control package weight on a slice-by-slice basis thereby minimizing give-away.

10. A food slicing apparatus according to claim 9 wherein said last-named means is constructed and arranged to provide a change in knife location to provide a correction in excess of 50% of the total correction required.

11. A food slicing apparatus according to claim 9 wherein said last-named means is constructed and arranged to provide a change in knife location to provide a correction of at least 80–90% of the total correction required.

12. A food slicing apparatus according to claim 9 wherein said last-named means is operative to cause both blade means location changes and feed rate changes of equal magnitude.

13. Food slicing apparatus according to claim 7 wherein both said blade loop and said feed rate loop are closed position loops.

14. Food slicing apparatus for multiple slice food packages comprising: means for feeding a food product having a generally uniform cross section into a cutting area; blade means cyclically operable to traverse said cutting area in one direction to cut a slice from a food product therein; means mounting said blade means for moving in a direction non-parallel to said one direction; means adjacent said cutting area for receiving slices to form a package cut by said blade means and for providing a signal indicative of the actual weight of the then cut slices intended to form a package; means for receiving said signal and for generating an error signal after substantially each slice cut whenever it appears that the actual package weight will deviate from a predetermined standard package weight; and means for receiving said error signal and for moving said blade means in said second direction in response thereto to change slice thickness, and thus slice weight, whereby package weight is controlled on a slice by slice basis as the slices to form a package are being cut.

15. Food slicing apparatus for multiple slice food packages comprising: means for feeding a food product having a generally uniform cross section into a cutting area; blade means cyclically operable to traverse said cutting area to cut a slice from a food product therein; means adjacent said cutting area for receiving the slices to form a package cut by said blade means and for providing a signal indicative of the actual weight of the then cut slices to form a package; means for providing a standard weight signal indicative of the desired weight of the then cut slices to form a package; a servo control for said feeding means; means for providing said servo control with a signal indicative of the difference, if any, between said standard weight and actual weight signals to cause said servo control to adjust the feeding means to alter the feed rate of the food product into the cutting area; and means associated with one of said feeding means and said servo control for providing a feedback signal to said servo control to halt adjustment of feed rate by said servo control when said difference signal and said feedback signal are substantially equal.

16. Food slicing apparatus according to claim 15 wherein said standard weight signal providing means comprises a resistive matrix, counter means, means for stepping said counter means each time a slice is cut, and means responsive to said counter means for connecting into said matrix and having an output on which said standard weight signal may be placed; said actual weight signal providing means comprises a weigh cell having an output on which said actual weight signal may be issued; and means connecting both said outputs to said servo control.

References Cited

UNITED STATES PATENTS 3,310,087    3/1967    Werder et al. _____ 146—105X
3,508,591    4/1970    Johnson et al. _____ 146—94

ANDREW R. JUHASZ, Primary Examiner

Z. R. BILINSKY, Assistant Examiner

U.S. Cl. X.R.

146—105; 177—164, 245